United States Patent [19]

Wetzel

[11] Patent Number: 4,650,443
[45] Date of Patent: Mar. 17, 1987

[54] SYNCHRONOUS DRIVE SYSTEM AND METHOD OF MAKING THE SAME

[75] Inventor: Robert E. Wetzel, Springfield, Mo.

[73] Assignee: Dayco Products, Inc., Dayton, Ohio

[21] Appl. No.: 827,999

[22] Filed: Feb. 10, 1986

Related U.S. Application Data

[62] Division of Ser. No. 671,392, Nov. 15, 1984, abandoned.

[51] Int. Cl.[4] .......................... F16H 7/02; F16G 1/28
[52] U.S. Cl. ...................................... 474/153; 474/205
[58] Field of Search ........................ 474/205, 153, 250

[56] References Cited

U.S. PATENT DOCUMENTS

| 4,403,979 | 9/1983 | Wujick | 474/153 |
| 4,604,080 | 8/1986 | Mizuno | 474/153 |
| 4,605,389 | 8/1986 | Westhoff | 474/153 |

Primary Examiner—James A. Leppink
Assistant Examiner—Matthew Smith
Attorney, Agent, or Firm—Joseph V. Tassone

[57] ABSTRACT

The combination of a toothed pulley and a toothed belt and method of making the same are provided. The toothed belt has teeth that serially mesh with cavities of the pulley that are respectively disposed between adjacent teeth thereof and that respectively have bottoms. Each pulley tooth is substantially curvilinear. Each belt tooth has a longitudinal cross-sectional configuration that defines a pair of spaced side faces that respectively have free end portions that are remote from adjacent roots thereof and that are spaced apart from each other by a bottom face of the tooth, each bottom face having a center. The teeth of the pulley and the belt are so constructed and arranged that each belt tooth has a longitudinal substantially trapezoidal cross-sectional configuration that defines the free end portions thereof as a pair of spaced corner means thereof that are remote from said adjacent root means thereof and that each belt tooth would have the pair of free corner means thereof compressed radially outwardly and inwardly toward each other by the respective adjacent pulley teeth while the bottom face thereof has its center spaced from the bottom of the cavity between those respective adjacent pulley teeth if that belt tooth is fully received in the cavity between those respective adjacent pulley teeth and those respective adjacent pulley teeth are just making contact with the land areas of the belt on each side of that belt tooth while being spaced from the respective roots of that belt tooth.

22 Claims, 8 Drawing Figures

SYNCHRONOUS DRIVE SYSTEM AND METHOD OF MAKING THE SAME

CROSS REFERENCE TO RELATED APPLICATION

This application is a division patent application of its copending parent patent application, Ser. No. 671,392, filed Nov. 15, 1984, now abandoned.

1. Field of the Invention

This invention relates to an improved synchronous belt and pulley drive system and to a method of making such a drive system.

2. Prior Art Statement

It is known to provide the combination of a toothed pulley and a toothed belt that has the teeth thereof serially mesh with cavities of the pulley that are respectively disposed between adjacent teeth thereof each pulley tooth being substantially curvilinear and, each belt tooth having a longitudinal cross-sectional configuration that defines a pair of spaced side face means that respectively have free end portions thereof that are remote from adjacent root means thereof. For example, see the U.S. Pat. No. 4,403,979 to Wujick; the U.S. Pat. No. 3,756,091 to Miller, and the U.S. Pat. No. 3,404,576, to Cicognani et al.

It is also known to provide a non-conjugate action of the belt teeth with the pulley teeth to decrease contact stress. For example, see the U.S. Pat. No. 2,987,932 to Szonn; U.S. Pat. No, 3,026,737 to Berg; U.S. Pat. No. 3,968,701 to Maruyama; U.S. No. 4,007,644 to Weinberger, and the U.S. Pat. No. 4,148,225 to Redmond, Jr. et al.

SUMMARY OF THE INVENTION

It is one feature of this invention to provide a combination of a toothed pulley and a toothed belt which relieves the high sheer stress at the roots of the belt teeth as well as reduces land area slapping.

In particular, it was found according to the teachings of this invention that the belt teeth and the pulley teeth of a synchronous drive system could be so constructed and arranged that the free end portions of each belt tooth could be compressed radially outwardly and inwardly toward each other by the respective adjacent pulley teeth before those adjacent pulley teeth make contact with the land areas of the belt on each side of that belt tooth while being spaced from the respective root means of that belt tooth whereby the resulting pre-stressing and trapping of that belt tooth by those adjacent pulley teeth maintain that belt tooth in the pulley groove in a manner that is believed to reduce land wear and thereby extend the life of the belt.

For example, one embodiment of this invention provides the combination of a toothed pulley and a toothed belt that has the teeth thereof serially mesh with cavities of the pulley that are respectively disposed between adjacent teeth thereof and that respectively have bottoms, each pulley tooth being substantially curvilinear and each belt tooth having a longitudial cross-sectional configuration that defines a pair of spaced side face means that respectively have free end portions thereof that are remote from adjacent root means thereof and that are spaced apart from each other by a bottom face means of the tooth. Each bottom face means has a center. The teeth of the pulley and the belt are so constructed and arranged that each belt tooth has a longitudinal substantially trapezoidal cross-sectional configuration that defines the free end portions thereof as a pair of spaced free corner means thereof that are remote from said adjacent root means thereof and that each belt tooth would have the pair of free corner means thereof compressed radially outwardly and inwardly toward each other by their respective adjacent pulley teeth while the bottom face means thereof has its center spaced from the bottom of the cavity between those respective adjacent pulley teeth if that belt tooth is fully received in the cavity between those respective adjacent pulley teeth and those respective adjacent pulley teeth are just making contact with the land areas of the belt on each side of that belt tooth while being spaced from the respective root means of that belt tooth.

Accordingly, it is an object of this invention to provide an improved combination of a toothed pulley and a toothed belt that has the teeth thereof serially mesh with cavities of the pulley that are respectively disposed between adjacent teeth thereof, the combination of this invention having one or more of the novel features of this invention as set forth above or hereinafter shown or described.

Another object of this invention is to provide a method of making the combination of a toothed pulley and a toothed belt that has the teeth thereof serially mesh with cavities of the pulley that are respectively disposed between adejacent teeth thereof, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENTS

Figure 1:
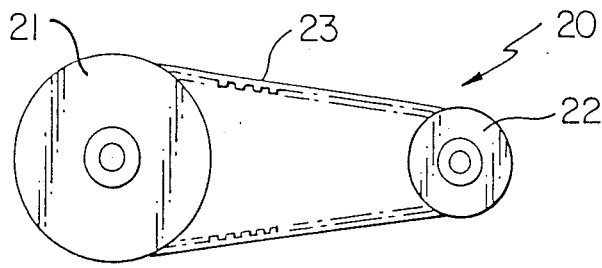
FIG. 1 is a schematic view illustrating the synchronous drive system of this invention.

While the various features of this invention are hereinafter illustrated and described as providing a synchronous drive system wherein the belt teeth are each substantially trapezoidal in their longitudinal cross-sectional configurations and the pulley teeth are substantially curvilinear in their longitudinal cross-sectional configurations, it is to be understood that the various features of this invention can be utilized singly or in any combination thereof to provide a synchronous drive system wherein the belt teeth and/or the pulley teeth have different longitudinal cross-sectional configurations while still providing the improved features of this invention.

Therefore, this invention is not to be limited to only the embodiments illustrated in the drawings, because the drawings are merely utilized to illustrate one of the wide variety of uses of this invention.

Referring now to FIG. 1, the improved synchronous drive system or combination of a toothed pulley and a toothed belt that has the teeth thereof serially mesh with cavities of the pulley that are respectively disposed between adjacent teeth thereof is generally indicated by the reference numeral 20 and comprises a pair of toothed pulleys 21 and 22 and an endless toothed belt 23 cooperating therewith to transmit a driving relation between the pulleys 21 and 22 in a manner that is substantially conventional in the art, except for the improved features of this invention as hereinafter set forth, and such an arrangement is generally set forth in the aforementioned seven U.S. Pat. Nos. 3,756,091; 3,404,576; 2,987,932; 3,026,737; 3,968,701; 4,007,644 and 4,148,225 whereby these seven U.S. patents are all being incorporated into this disclosure by this reference thereto.

The pulleys 21 and 22 can be formed of any suitable material, such as metallic material, and differ from each other in that the effective diameters thereof are different whereby the number of teeth thereon are likewise different but the overall configuration of the teeth thereof are basically the same.

However, it is to be understood that the configuration of the teeth of the pulleys 21 and 22 could be different as long as at least one of the pulleys 21 or 22 has the teeth thereof perform the inventive features of this invention with the belt 23 as hereinafter set forth.

Figure 4:
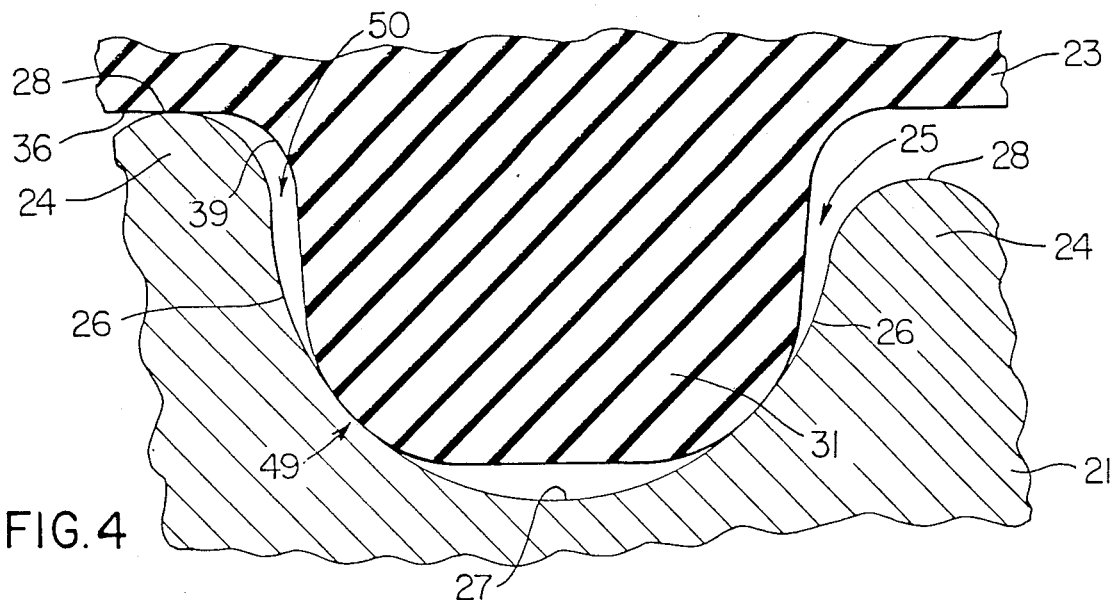
FIG. 4 is a fragmentary schematic cross-sectional view illustrating one of the teeth of the belt of this invention as it initially enters the cavity between a pair of pulley teeth of the pulley of the system illustrated in FIG. 1.
Figure 5:
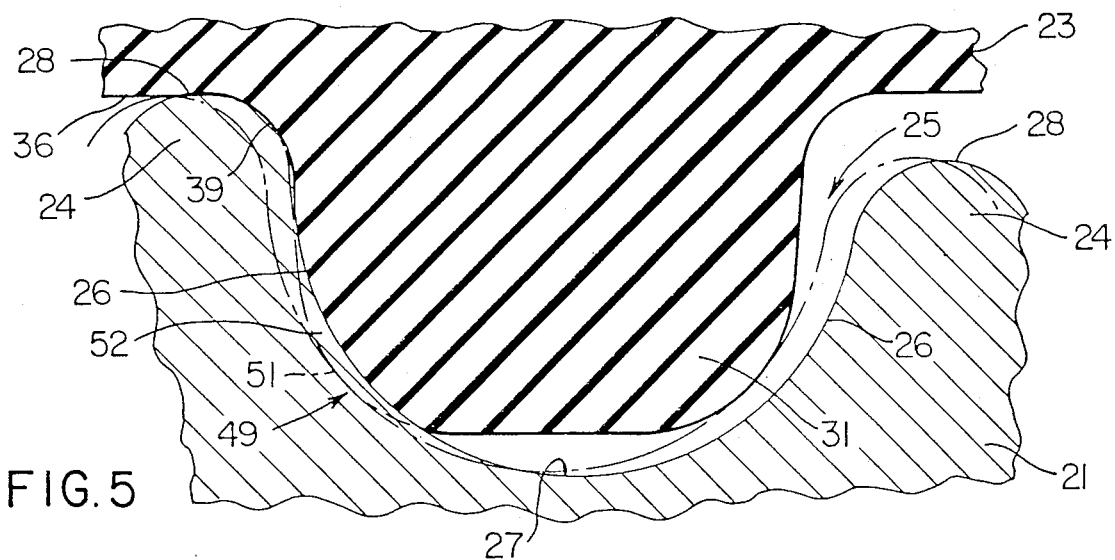
FIG. 5 is a view similar to FIG. 4 and illustrates a further movement between the belt tooth of FIG. 4 and the pulley teeth of FIG. 4.
Figure 6:
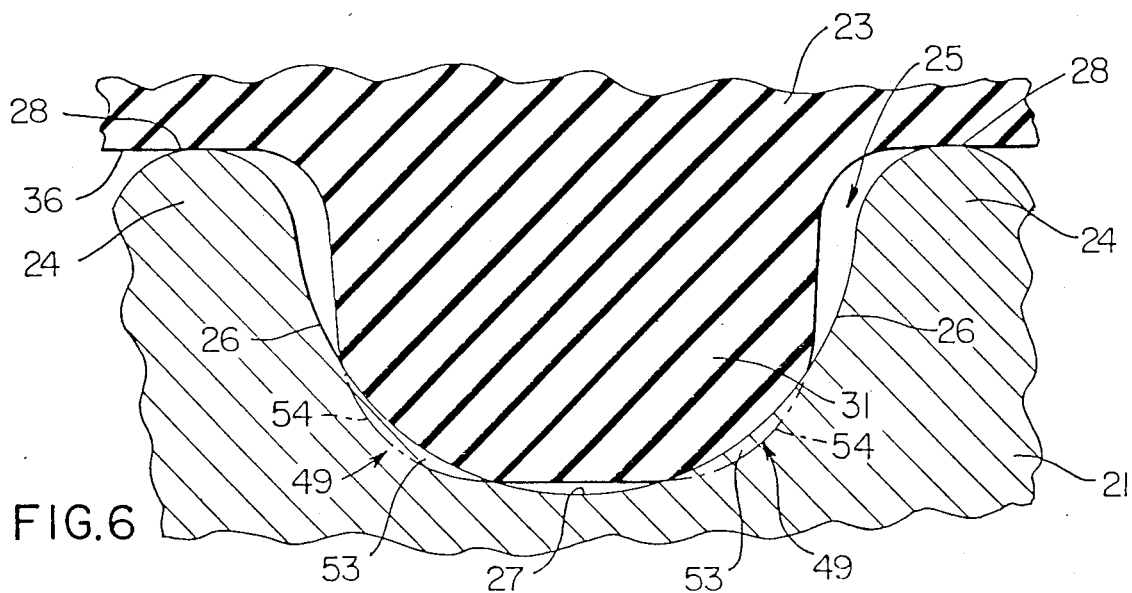
FIG. 6 is a view similar to FIG. 4 and illustrates the theoretical pre-stressing of the belt tooth of FIG. 4 if that belt tooth of FIG. 4 is fully received into the cavity defined by the two pulley teeth with those two pulley teeth just making contact with the land areas on opposite sides of that belt tooth while being spaced from the root means of the belt tooth.

Accordingly, reference is now made to FIGS. 4, 5 and 6 wherein it can be seen that the pulley 21 (and/or pulley 22) has a plurality of substantially curvilinear pulley teeth 24 extending around the periphery thereof with each pair of adjacent teeth 24 defining a cavity therebetween that is generally indicated by the reference numeral 25. The longitudinal cross-sectional configurations of the pulley teeth 24 define facing curvilinear side face means 26 that define the cavity 25 therebetween with the side face means 26 of adjacent pulley teeth 24 joining together at the bottom 27 of the cavity 25 as illustrated in FIG. 4 and joining with other side face means 26 to define outer tips 28 of the pulley teeth 24 that are also substantially curvilinear.

As previously stated, the longitudinal cross-sectional configuration of the pulley teeth 24 can be any suitable configuration which will produce the improved results of this invention as hereinafter set forth. However, in the embodiment illustrated in FIGS. 4–6, the configuration of the pulley teeth 24 and, thus, of the pulley 21 is substantially the same as the pulley illustrated in FIG. 3 of the aforementioned U.S. Pat. No. 3,756,091 to Miller, whereby further details of the pulley 21 need not be set forth.

Figure 2:
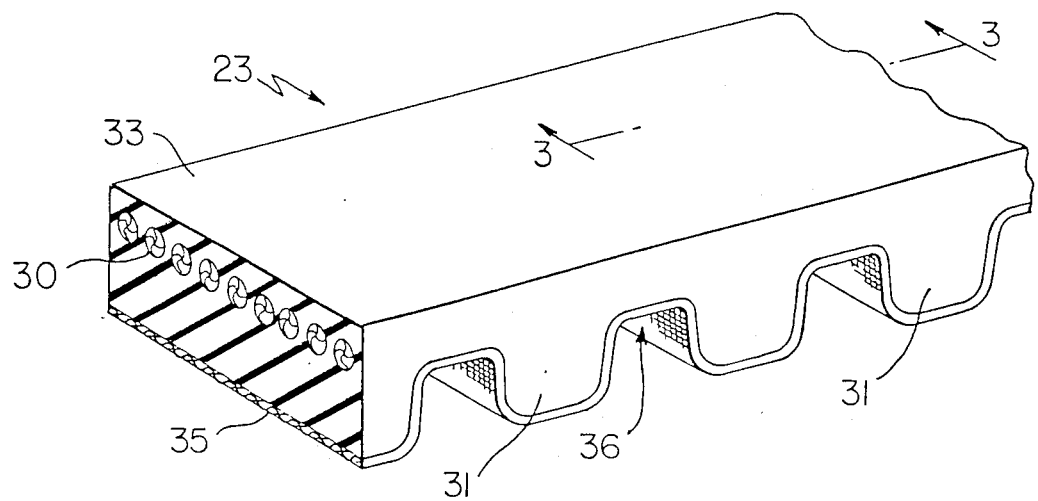
FIG. 2 is an enlarged fragmentary perspective view illustrating the improved belt of the drive system of FIG. 1.
Figure 3:
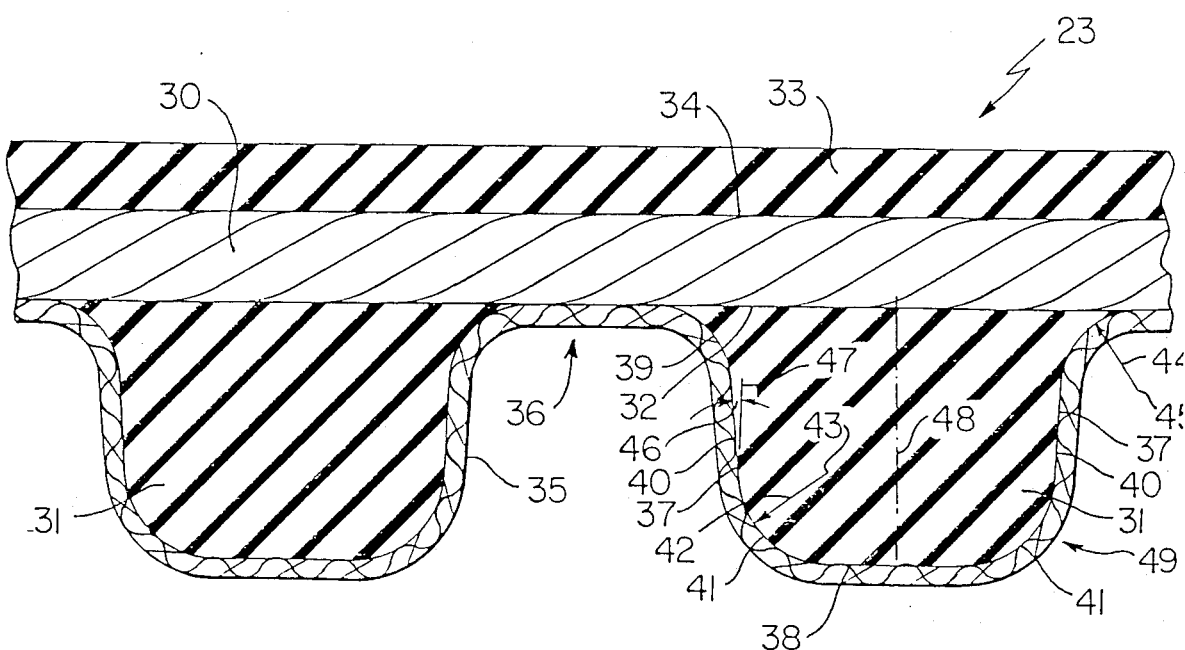
FIG. 3 is an enlarged fragmentary cross-sectional view taken on line 3—3 of FIG. 2.

The belt 23 of this invention is best illustrated in FIGS. 2 and 3 and comprises a conventional tensile means 30 having a plurality of teeth 31 extending from the inner side 32 thereof and a backing member 33 extending from the outer side 34 thereof, the teeth 31 and backing member 33 being mainly formed from any suitable fiber loaded or unloaded polymeric material or materials and being formed in any suitable manner, such as in the manner set forth in the U.S. Pat. No. 3,078,206 to Skura, the U.S. Pat. No. 4,343,666, to Wetzel, the co-pending U.S. patent application of Marsh et al, Ser. No. 502,777, filed June 9, 1983, the co-pending U.S. patent application of Wetzel et al, Ser. No. 658,832, filed Oct. 9, 1984, the co-pending U.S. patent application of Whitt, Ser. No. 659,159, filed Oct. 9,1984, etc., whereby these two U.S. patents and three U.S. co-pending patent applications are all being incorporated into this disclosure by this reference thereto.

Therefore, it can be seen that the particular method of making the belt construction 23 of this invention is not to be a limitation on this invention as this invention is directed to the feature of forming the belt teeth 31 and the pulley teeth 24 to cooperate in a unique manner as hereinafter set forth.

If desired, a conventional fabric layer 35 can cover the outer surface of the teeth 31 as well as the land areas 36 of the belt 23 that are disposed between adjacent teeth 31 in a conventional manner.

Each belt tooth 31 has a longitudinal cross-sectional configuration that is substantially trapezoidal and defines opposed side face means 37 that respectively join with a substantially flat bottom face means 38 and substantially curvilinear root means 39, each side face 37 having a substantially flat or straight section 40 and an arcuate section 41 with the arcuate section 41 being defined by a radius 42 having its center 43 disposed intermediate the opposed side face means 37 of the respective tooth 31. Each arcuate root means 39 of each belt tooth 31 is defined by a radius 44 having its center 45 disposed outboard of the respective side face means 37. The flat section 40 of each side face means 37 of each belt tooth 31 joins with its respective arcuate root means 39 and with its arcuate section 41 while that arcuate section 41 joins with the flat bottom face means 38, the flat section 40 of each side face means 37 being disposed at an angle 46 relative to a line 47 which is substantially parallel to the transverse center line 48 of that respective belt tooth 31.

The arcuate section 41 of each side face means 37 of each belt tooth 31 defines at least part of a free end portion or corner means of the belt tooth 31 that is generally indicated by the reference numeral 49 and is disposed remote from the respective root means 39 of that belt tooth 31.

The size of the belt teeth 31 relative to the cavities 25 of the pulley 21 (and/or pulley 22) is so selected that when a particular belt tooth 31 of the belt 23 as illustrated in FIG. 4 is initially received in the cavity 25 between an adjacent pair of pulley teeth 24, with the pulley 21 and belt 23 both rotating in a counterclockwise direction in FIG. 4, the left-hand land means 36 of the belt 23 makes contact with the tip 28 of the left-hand pulley tooth 24 while the corner means 49 of that belt tooth 31 initially and respectively make contact with the opposed side faces 26 of the adjacent belt teeth 24.

At this time, it can be seen that a relatively wide gap or area 50 is provided between the left-hand root means 39 of that belt tooth 31 and the adjacent surface or face means 26 of the left-hand pulley tooth 24 so that no stress is being placed on that root means 39.

Further rotation of the pulley means 21 and belt means 23 in a counterclockwise direction from the position illustrated in FIG. 4 to the position illustrated in FIG. 5 causes the tooth 31 to be compressed in the left-hand corner means 49 thereof, as represented by the dash-dotted line 51 in FIG. 5, before the left-hand root means 39 makes contact with the side face means 26 of the left-hand tooth 24, the line 51 being the normal outline profile of the belt tooth 31. In this manner, the left-hand corner means 49 of the belt tooth 31 is compressed radially outwardly and inwardly to the right by the amount represented by the area 52 in FIG. 5 that is bordered by the line 51 and the side face means 26 of the left-hand tooth 24 as illustrated in FIG. 5 and this compression takes up a considerable force in the belt tooth 31 at a point therein that is remote from the left-hand root means 39 before any force would be placed on the left-hand root area 39 of the belt 23.

It is believed that providing such compression area 52 in the belt tooth 31 remote from its respective root means 39 enhances the life of the belt means 23 by removing as much stress or strain in the root areas 39 of the belt teeth 31 as possible during their driving or driven operation with the pulley 21.

The configurations and arrangement of the belt teeth 31 and pulley teeth 24 are such that if the respective belt tooth 31 could be theoretically fully and uniformly received in the cavity 25 between the adjacent pulley teeth 24 in the manner illustrated in FIG. 6, the corner means 49 of the belt tooth 31 would be radially outwardly and inwardly compressed toward each other by the amount represented by the areas 53 in FIG. 6 that is bounded by the surface means 26 of the adjacent pulley teeth 24 and the normal profile outline of the belt tooth 31 represented by the dash-dotted lines 54 in FIG. 6 at the time the pulley teeth 24 have the tips 28 thereof just engaging the adjacent land areas 36 of the belt 23 on each side of that belt tooth 31 while the side face means 26 of the adjacent pulley teeth 24 are respectively spaced from the adjacent root means 39 of the belt tooth 31 by the large gaps 50' illustrated in FIG. 6 whereby theoretically no force or stress is being imposed on the root means 39 or land areas 36 at this time.

In this manner, it can be seen that each belt tooth 31 of the belt 23 of this invention cooperates with its receiving cavity 25 between adjacent pulley teeth 24 by having both of the corner means 49 thereof compressed radially outwardly and inwardly toward each other through the trapping effect of the side face means 26 of the adjacent pulley teeth 24 which produces both a radial and horizontal pre-stressing of the belt tooth 31 before the root means 39 and land areas 36 of the belt 23 are subsequently stressed by further action between the respective belt tooth 31 and pulley teeth 24 through the normal work load being imposed thereon and it is believed that this pre-stressing effect results in increased belt life and reduced noise by relieving the high sheer stress at the root means 39 of each belt tooth 31 and a reduced land area slapping by the land areas 36 engaging the tips 28 of the teeth 24.

While the invention is not to be limited to any particular configurations or dimensions, one belt 23 of this invention that has been utilized in pulleys 21 and 22 formed similar to the aforementioned U.S. Pat. No. 3,756,091, to Miller, wherein generally the radius of curvature of each cavity 25 is approximately 0.103 of an inch and the cavity depth is approximately 0.142 of an inch, had the pitch of the belt teeth 31 thereof approximately 0.31496 of an inch, the number of belt teeth being 120, the belt pitch length being approximately 37.795275 inches and the belt pitch diameter being approximately 12.030609 inches. The belt teeth 31 of such belt 23 each had an overall height along the center line 48 from the bottom surface face 38 to approximately the inner side 32 of the tensile means 30 of approximately 0.130 of an inch with the distance between the corner means 49 thereof being approximately 0.182 of an inch, each radius 42 thereof being approximately 0.060 of an inch, each radius 44 thereof being approximately 0.031 of an inch and the flat sections 40 thereof making an included angle of approximately 9°.

Such a belt provided the gross interference during engagement with the pulley as previously described and this actually increased belt life as well as provided a quieter drive system. For example, the prior known belt for such system had a belt life of approximately 122.7 hours whereas the life of the belt 23 of this invention was approximately 193.6 hours.

As previously stated, the particular configurations of the pulley teeth 24 and belt teeth 31 cooperating therewith in the unique manner provided by this invention can be provided by other configurations than those illustrated in the drawings and previously described.

Figure 7:
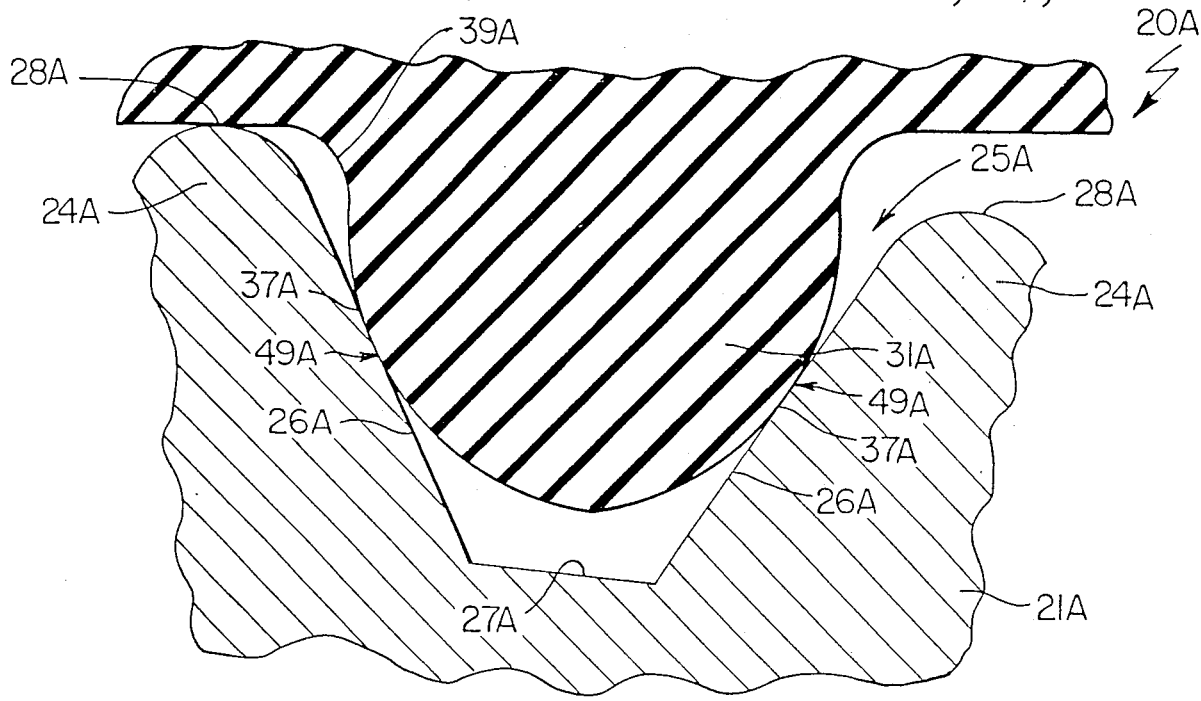
FIG. 7 is a view similar to FIG. 4 and illustrates another embodiment of this invention.
Figure 8:
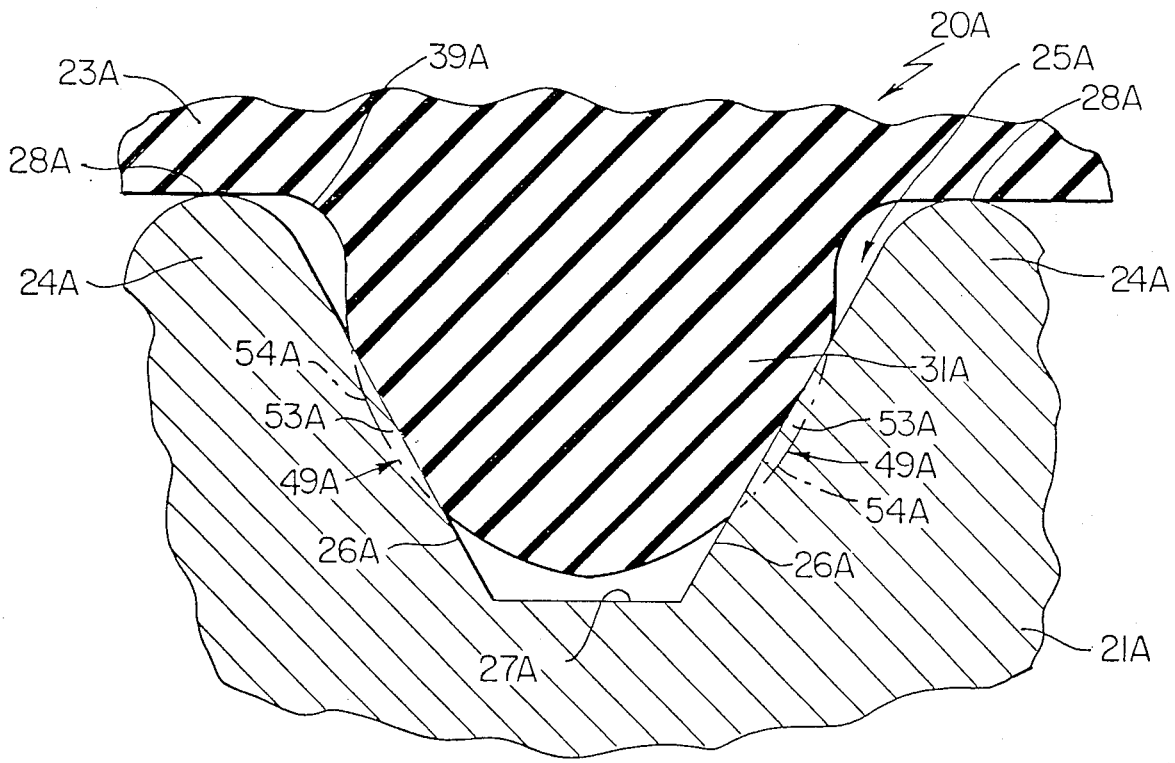
FIG. 8 is a view similar to FIG. 6 with the embodiment of FIG. 7.

For example, reference is now made to FIGS. 7 and 8 wherein another synchronous drive system of this invention is generally indicated by the reference numeral 20A and parts thereof similar to the drive system 20 previously described are indicated by like reference numerals followed by the reference letter "A."

As illustrated in FIGS. 7 and 8, the pulley 21A has the teeth 24A thereof so constructed and arranged that the same provide a substantially trapezoidal cavity 25A between adjacent pulley teeth 24A that is defined by substantially flat side face means 26A even though the tips 28A of the teeth 24A are rounded as illustrated. However, the bottom 27A of each cavity 25A is substantially flat as illustrated.

In contrast, the longitudinal cross-sectional configuration of each belt tooth 31A of the belt 23A of this invention is substantially the same as the configurations set forth in FIG. 2 of the aforementioned U.S. Pat. No. 3,756,091, to Miller and would theoretically have the opposed free end portions 49A of the opposed side face means 37A thereof compressed radially outwardly and inwardly toward each other by the amount of areas 53A represented in FIG. 8 as the area bordered by the side faces 26A of the pulley teeth 24A and the dash-dotted lines 54A that depict the normal profile of the tooth 31A when that tooth 31A is fully and uniformly received in the cavity 25A and has the tips 28A of the pulley teeth 24A just engaging the land areas 36A on each side of that tooth 31A as illustrated in FIG. 8. At this time, it can be seen in FIG. 8 that the root means 39A of the belt tooth 31A are fully spaced from the sides 26A of the adjacent pulley teeth 24A in the same manner as the root means 39 of the teeth 31 in the cavities 25 as previously described whereby it is believed the belt 23A and pulley 21A will function in the manner previously set forth to extend the life of the belt 23A through prestressing thereof as well as reduce the noise of operation thereof through reduced land slapping thereof.

Therefore, it can be seen that this invention not only provides an improved synchronous drive system or combination of a toothed pulley and a toothed belt, but also this invention provides an improved method of making such a drive system or combination.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the patent statute.

What is claimed is:

1. In the combination of a toothed pulley and a toothed belt that has the teeth thereof serially mesh with cavities of said pulley that are respectively disposed between adjacent teeth thereof and that respectively have bottoms, each pulley tooth being substantially curvilinear, each belt tooth having a longitudinal cross-sectional configuration that defines a pair of spaced side face means that respectively have free end portions thereof that are remote from adjacent root means thereof and that are spaced apart from each other by a bottom face means of said tooth, each bottom face means having a center, the improvement wherein said teeth of said pulley and said belt are so constructed and arranged that each belt tooth has a longitudinal substantially trapezoidal cross-sectional configuration that defines said free end portions thereof as a pair of spaced free corner means thereof that are remote from said adjacent root means thereof and that each belt tooth would have said pair of free corner means thereof compressed radially outwardly and inwardly toward each other by the respective adjacent pulley teeth while said bottom face means thereof has its said center spaced from said bottom of the cavity between those respective adjacent pulley teeth if that belt tooth is fully received in the cavity between those respective adjacent pulley teeth and those respective adjacent pulley teeth are just making contact with the land areas of the belt on each side of that belt tooth while being spaced from the respective root means of that belt tooth.

2. The combination as set forth in claim 2 wherein each belt tooth has a substantially flat surface that extends between said pair of free corner means thereof and defines said bottom face means thereof.

3. The combination as set forth in claim 1 wherein said belt tooth has said opposed side face means thereof each comprising a substantially flat section and a substantially arcuate section.

4. The combination as set forth in claim 3 wherein each belt tooth has said flat section of each side face means thereof adjacent said root means thereof and said arcuate section of said side face means thereof defining at least part of said corner means thereof.

5. The combination as set forth in claim 4 wherein said arcuate section of each side face means of each belt tooth is defined in a radius having its center disposed intermediate said opposed side face means of that belt tooth.

6. The combination as set forth in claim 4 wherein said arcuate section of each side face means of each belt tooth joins with said flat section thereof.

7. The combination as set forth in claim 6 wherein each belt tooth has a substantially flat end surface that extends between said pair of free corner means thereof and that defines said bottom face means thereof.

8. The combination as set forth in claim 7 wherein said flat end surface of each belt tooth joins with said arcuate sections of said side face means thereof.

9. The combination as set forth in claim 8 wherein the height of each belt tooth is approximately 0.130 of an inch.

10. The combination as set forth in claim 9 wherein the length of said radius of each belt tooth is approximately 0.060 of an inch.

11. The combination as set forth in claim 10 wherein the pitch of said teeth of said belt is approximately 0.31496 of an inch.

12. In the method of making the combination of a toothed pulley and a toothed belt that has the teeth thereof serially mesh with cavities of said pulley that are respectively disposed between adjacent teeth thereof and that respectively have bottoms, each pulley tooth being substantially curvilinear, each belt tooth having a longitudinal cross-sectional configuration that defines a pair of spaced side face means that respectively have free end portions thereof that are remote from adjacent root means thereof and that are spaced apart from each other by a bottom face means of said tooth, each bottom face means having a center, the improvement comprising the step of forming said teeth of said pulley and said belt to be so constructed and arranged that each belt tooth has a longitudinal substantially trapezoidal cross-sectional configuration that defines said free end portions thereof as a pair of spaced free corner means thereof that are remote from said adjacent root means thereof and that each belt tooth would have said pair of free corner means thereof compressed radially outwardly and inwardly toward each other by the respective adjacent pulley teeth while said bottom face means thereof has its said center spaced from said bottom of the cavity between those respective adjacent pulley teeth if that belt tooth is fully received in the cavity between those respective adjacent pulley teeth and those respective adjacent pulley teeth are just making contact with the land areas of the belt on each side of that belt tooth while being spaced from the respective root means of that belt tooth.

13. The method as set forth in claim 12 and including the step of forming each belt tooth to have a substantially flat surface that extends between said pair of free corner means thereof and that defines said bottom face means thereof.

14. The method as set forth in claim 12 and including the step of forming each belt tooth to have each said opposed side face means thereof comprise a substantially flat section and a substantially arcuate section.

15. The method as set forth in claim 14 and including the step of forming each belt tooth to have said flat section of each side face means thereof adjacent said root means thereof and said arcuate section of each side face means thereof defining at least part of said corner means thereof.

16. The method as set forth in claim 15 and including the step of forming said arcuate section of each side face means of each belt tooth to be defined by a radius having its center disposed intermediate said opposite side face means of that belt tooth.

17. The method as set forth in claim 15 and including the step of forming said arcuate section of each side face means of each belt tooth to join with said flat section thereof.

18. The method as set forth in claim 17 and including the step of forming each belt tooth to have a substantially flat end surface that extends between said pair of free corner means thereof and that defines such bottom face means thereof.

19. The method as set forth in claim 18 and including the step of forming said flat end surface of each belt tooth to join with said arcuate sections of said side face means thereof.

20. The method as set forth in claim 19 and including the step of forming the height of each belt tooth to be approximately 0.130 of an inch.

21. The method as set forth in claim 21 and including the step of forming the length of said radius of each belt tooth to be approximately 0.060 of an inch.

22. The method as set forth in claim 22 and including the step of forming the pitch of said teeth of said belt to be approximately 0.31496 of an inch.

* * * * *